(12) United States Patent
Boskovitch et al.

(10) Patent No.: US 8,545,353 B2
(45) Date of Patent: Oct. 1, 2013

(54) DRIVE CONFIGURATIONS FOR HIGH HYBRID SERIES/PARALLEL HIGH SPEED MOTOR DRIVE SYSTEMS

(75) Inventors: Paul Boskovitch, Costa Mesa, CA (US); J. Axel Radermacher, Foothill Ranch, CA (US)

(73) Assignee: Fisker Automotive, Inc., Anaheim, CA (US)

( * ) Notice: Subject to any disclaimer, the term of this patent is extended or adjusted under 35 U.S.C. 154(b) by 0 days.

(21) Appl. No.: 13/336,889

(22) Filed: Dec. 23, 2011

(65) Prior Publication Data

US 2012/0165148 A1    Jun. 28, 2012

Related U.S. Application Data

(63) Continuation of application No. PCT/US2010/039801, filed on Jun. 24, 2010.

(60) Provisional application No. 61/220,048, filed on Jun. 24, 2009.

(51) Int. Cl.

| | |
|---|---|
| *F16H 3/72* | (2006.01) |
| *F16H 37/06* | (2006.01) |
| *B60W 10/02* | (2006.01) |
| *B60W 10/08* | (2006.01) |
| *B60W 10/04* | (2006.01) |
| *B60W 20/00* | (2006.01) |
| *B60K 1/00* | (2006.01) |
| *H02P 15/00* | (2006.01) |

(52) U.S. Cl.
USPC ........... 475/5; 477/5; 477/6; 477/8; 180/65.6; 180/65.7; 180/65.275

(58) Field of Classification Search
USPC .......... 475/5, 9, 10; 477/3, 5, 6, 8; 180/65.6, 180/65.7, 65.275, 65.28, 65.285; 903/910, 903/909, 918
See application file for complete search history.

(56) References Cited

U.S. PATENT DOCUMENTS

| | | | |
|---|---|---|---|
| 1,661,780 | A | 3/1928 | Warhus |
| 2,570,319 | A | 10/1951 | Cassady |
| 2,844,209 | A | 7/1958 | Brunderman |
| 3,082,335 | A | 3/1963 | De Lancey |
| 3,117,648 | A | 1/1964 | Homer |
| 3,648,795 | A | 3/1972 | Moulton |

(Continued)

OTHER PUBLICATIONS

International Search Report in PCT/US2010/039801 dated Aug. 27, 2010.

(Continued)

*Primary Examiner* — Tisha Lewis
(74) *Attorney, Agent, or Firm* — Foley & Lardner LLP

(57) ABSTRACT

A motor drive system configuration for a vehicle. The motor drive system includes an engine operable for providing power to the vehicle, a motor operable for providing power to a first wheel and a second wheel of the vehicle. The motor drive system also includes a first transmission mounted between the engine and the motor and in operative engagement with the motor and the engine. The first transmission includes a first clutch for coupling and decoupling the motor with the engine. The motor drive system also includes a differential in operative engagement with the transmission and coupled to the first wheel and the second wheel, and a clutch for disabling the connection between the motor and the wheels.

7 Claims, 3 Drawing Sheets

(56) References Cited

U.S. PATENT DOCUMENTS

| | | | |
|---|---|---|---|
| 4,161,226 A | 7/1979 | Warner et al. | |
| 4,418,777 A | 12/1983 | Stockton | |
| 4,864,889 A | 9/1989 | Sakakibara et al. | |
| 5,183,444 A | 2/1993 | Robbins | |
| 5,289,890 A | 3/1994 | Toyoda et al. | |
| 5,372,213 A | 12/1994 | Hasebe et al. | |
| 5,396,968 A | 3/1995 | Hasebe et al. | |
| 5,492,189 A | 2/1996 | Kriegler et al. | |
| 5,620,387 A | 4/1997 | Janiszewski | |
| 5,637,048 A | 6/1997 | Maeda et al. | |
| 5,759,128 A | 6/1998 | Mizutani et al. | |
| 5,807,205 A | 9/1998 | Odaka et al. | |
| 6,074,321 A | 6/2000 | Maeda et al. | |
| 6,155,364 A | 12/2000 | Nagano et al. | |
| 6,344,088 B1 * | 2/2002 | Kamikihara et al. | 118/712 |
| 6,349,782 B1 | 2/2002 | Sekiya et al. | |
| 6,364,806 B1 | 4/2002 | Spaniel | |
| 6,520,879 B2 | 2/2003 | Kawabata et al. | |
| 6,708,788 B2 | 3/2004 | Kuwayama | |
| 6,770,005 B2 | 8/2004 | Aikawa et al. | |
| 6,966,866 B2 | 11/2005 | Ando et al. | |
| 7,063,637 B2 | 6/2006 | Yamauchi et al. | |
| 7,115,057 B2 | 10/2006 | House | |
| 7,220,207 B2 | 5/2007 | Yamamoto | |
| 7,240,748 B2 | 7/2007 | Kira et al. | |
| 7,246,672 B2 * | 7/2007 | Shirai et al. | 180/65.25 |
| 7,261,660 B2 | 8/2007 | Sowul et al. | |
| 7,316,627 B2 | 1/2008 | Bennett | |
| 7,383,902 B2 * | 6/2008 | Matsuzaki et al. | 180/65.285 |
| 7,549,940 B2 | 6/2009 | Kira et al. | |
| 7,637,836 B2 * | 12/2009 | Watanabe et al. | 475/210 |
| 7,740,093 B2 * | 6/2010 | Abe et al. | 180/65.6 |
| 7,931,103 B2 | 4/2011 | Morrow et al. | |
| 7,990,004 B2 | 8/2011 | Aikawa et al. | |
| 8,142,317 B2 | 3/2012 | Nagamatsu | |
| 2001/0009878 A1 | 7/2001 | Kaneko et al. | |
| 2004/0251862 A1 * | 12/2004 | Imai | 318/376 |
| 2008/0076616 A1 | 3/2008 | Kidokoro et al. | |
| 2008/0185198 A1 | 8/2008 | Jones | |
| 2010/0041502 A1 | 2/2010 | Nagamatsu | |

OTHER PUBLICATIONS

International Search Report in PCT/US2010/039640 dated Aug. 19, 2010.

Non-Final Office Action U.S. Appl. No. 13/335,816 dated Jun. 1, 2012.

* cited by examiner

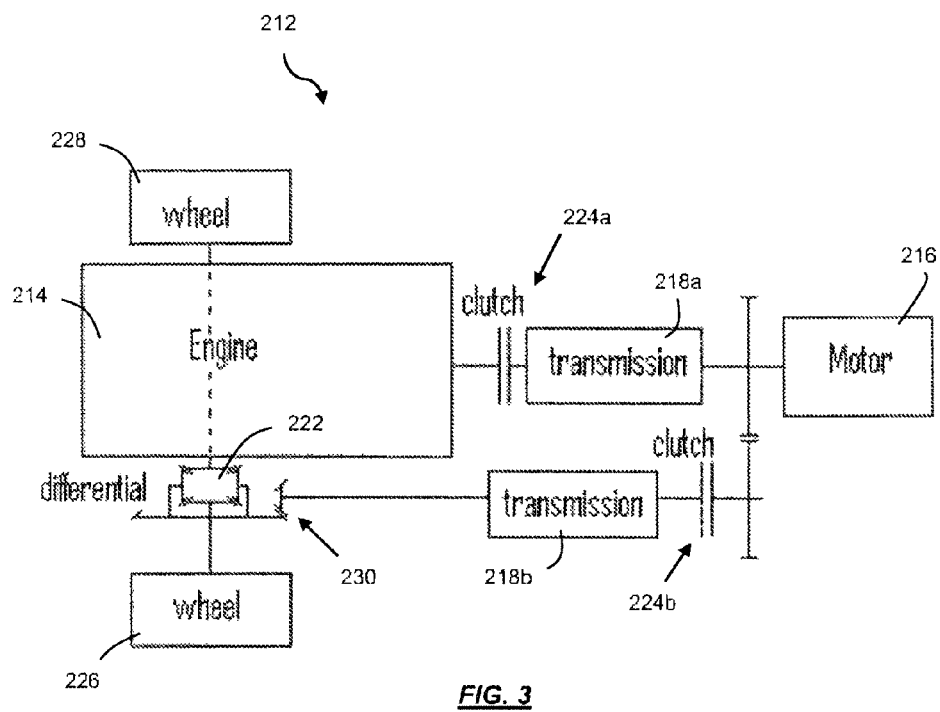

FIG. 3

| 250 | MODE | ENGINE | CLUTCH #1 | GB #1 | MOTOR | GB #2 | CLUTCH #2 | OPERATION |
|---|---|---|---|---|---|---|---|---|
| 255 | 1 | Cranking | Closed | In Gear | Power | N/A | Open | Motor starting engine |
| 260 | 2 | Powering | Closed | In Gear | Power | In Gear | Closed | Engine and/or motor driving wheels |
| 265 | 3 | Powering | Closed | In Gear | Generating | N/A | Open | Engine driving motor (acting as generator), wheels decoupled |
| 270 | 4 | N/A | Open | N/A | Power | In Gear | Closed | Motor driving wheels (EV operation) |
|  | 5 | N/A | Open | N/A | Generating | In Gear | Closed | Regenerative braking, motor taking power from wheels |

FIG. 4

DRIVE CONFIGURATIONS FOR HIGH HYBRID SERIES/PARALLEL HIGH SPEED MOTOR DRIVE SYSTEMS

CROSS-REFERENCE TO RELATED APPLICATIONS

This application is a Continuation of International Application PCT/US2010/039801, filed Jun. 24, 2010, which was published in English on Dec. 29, 2010 as WO 2010/151655 A1, which claims the benefit of U.S. Provisional Application No. 61/220,048, filed Jun. 24, 2009, all of which are incorporated herein by reference in their entirety.

BACKGROUND

The present disclosure relates generally to a motor drive system for a vehicle. More specifically, the present disclosure relates to a drive configuration for hybrid series and parallel high speed motor drive systems.

DESCRIPTION OF THE RELATED ART

Hybrid electric vehicles (HEV) and full electric vehicles (FEV) use motors to convert electrical energy into kinetic energy. Whereas HEVs combine an internal combustion engine and one or more electric motors, FEVs use electrical motors exclusively. The motors are typically part of a powertrain that generate power to drive a vehicle and the vehicle's motor drive system. There are a number of powertrain configurations including series hybrid and parallel hybrid. A series hybrid configuration uses electric drives powered by an internal combustion engine. The combustion engine drives an electric generator instead of directly driving the wheels. The engine of a series hybrid configuration may be useful for charging a battery, charging a capacitor, directly powering the electric motor, etc. In a parallel hybrid configuration, the electric motor(s) and the internal combustion engine are installed so that they can power the vehicle together or independently. The internal combustion engine, the electric motor and the gear box may be coupled by automatically controlled clutches. While the vehicle is operating in the electric mode, the clutch between the internal combustion engine is open while the clutch to the gear box is engaged. While the vehicle is operating in the combustion mode, the engine and motor run at the same speed or gear ratio dependent proportional speeds.

Conventional series hybrid and parallel hybrid configurations may suffer from efficiency losses under certain operating conditions because losses are sustained in both the generator and the motor. These losses in efficiency stem from resistance in the motor windings, switching in the inverter, etc. and may occur under various operating conditions, such as, highway cruising conditions where the impact is noted most severely. In addition, a four wheel drive series requires three electric machines if the front and back axles cannot be linked mechanically (one on the front axle, one on the rear axle, and one mounted on the engine acting as a generator). Moreover, conventional series hybrid and parallel hybrid configurations that are modifications of conventional architectures include electric machines that operate at speeds that increase costs.

Thus, there is a need in the art for a drive configuration for a motor drive system that is more efficient and cost effective and that enhances vehicle performance.

SUMMARY

Accordingly, the present disclosure relates to a motor drive system configuration for a vehicle. The motor drive system includes an engine operable for providing power to the vehicle, a motor operable for providing power to a first wheel and a second wheel of the vehicle. The motor drive system also includes a first transmission mounted between the engine and the motor and in operative engagement with the motor and the engine. The first transmission includes a first clutch for coupling and decoupling the motor with the engine. The motor drive system also includes a differential in operative engagement with the transmission and coupled to the first wheel and the second wheel.

An advantage of the present disclosure is that the drive configuration/arrangement promotes higher efficiency in terms of operation and performance. A further advantage of the present disclosure is that it reduces the number of electric machines needed when compared to a series hybrid electric all wheel drive (eAWD). Still a further advantage of the present disclosure is that it allows for mechanical power transfer from the engine to the wheels to improve efficiency. Still a further advantage of the present disclosure is that the drive configuration enables a compact package having low complexity and reduced costs.

Other features and advantages of the present disclosure will be readily appreciated, as the same becomes better understood after reading the subsequent description taken in conjunction with the accompanying drawings.

BRIEF DESCRIPTION OF THE DRAWINGS

FIG. 3 is schematic view of a motor drive system configuration, according to another embodiment.

FIG. 4 is a chart detailing various operating modes for the vehicle of FIG. 1 and corresponding operation of the motor drive system components, according to an exemplary embodiment.

DESCRIPTION

Figure 1:
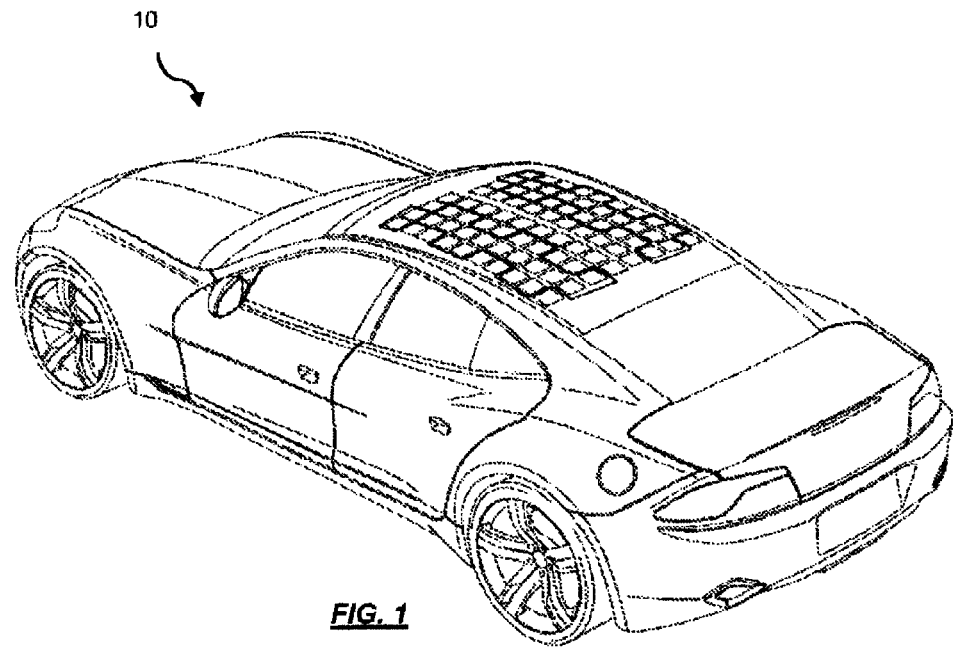
FIG. 1 is a perspective view of a vehicle, according to an exemplary embodiment.

Referring generally to the Figures and particularly to FIG. 1, a vehicle 10 is illustrated. In this example the vehicle 10 is a plug-in hybrid electric vehicle (HEV) that is gasoline and electric powered. The vehicle 10 may be a passenger car, truck, or other type of vehicle having a battery. In another example, the vehicle 10 is a dedicated battery powered vehicle. In still another example, the vehicle 10 is a full electric vehicle (FEV). The engine may operate on another fuel, such as, diesel, methane, propane, hydrogen, or the like.

Figure 2:
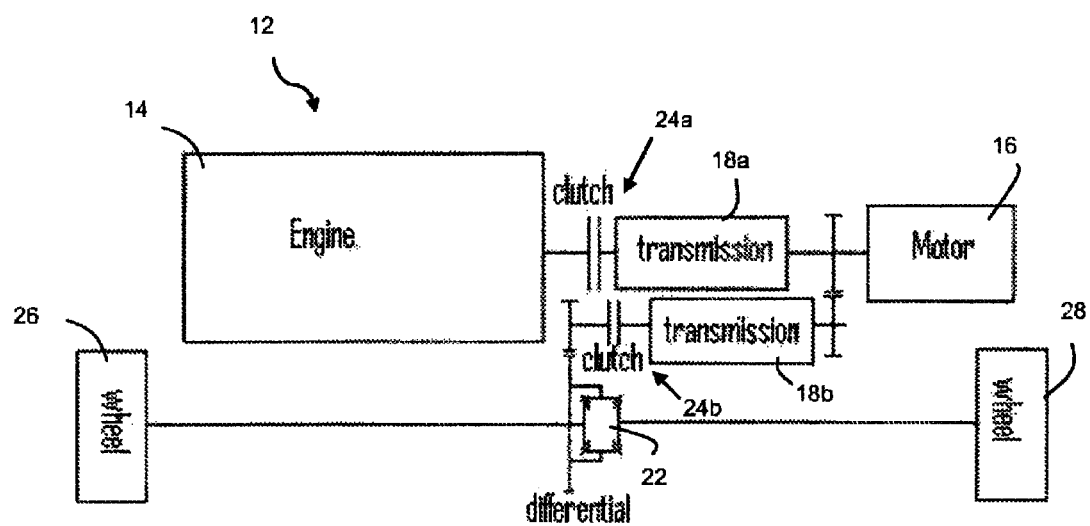
FIG. 2 is a schematic view of a motor drive system configuration for the vehicle of FIG. 1, according to an exemplary embodiment.

Referring now to FIG. 2, a motor drive system configuration 12 and arrangement for vehicles, such as, HEVs, or the like, are shown. The motor drive system includes various components coupled together in operative engagement, such as, an engine 14, a motor 16, a first transmission (gearbox) 18a, a second transmission 18b, a differential 22, a first clutch 24a, a second clutch 24b, a first wheel 26, and a second wheel 28. The motor drive system 12 also includes one or more axles, shafts, or the like; operatively interconnecting the various components of the motor drive system 12. The motor drive system can also include other components that are conventionally known or associated with a powertrain or motor drive system. Various types of engines are contemplated, such as, a four-cylinder gasoline powered engine, or the like. The selection of an engine is dependent on various factors, such as, vehicle size, weight, battery capacity, or the like. The motor 16 can be an electric machine, such as, a high speed electric motor. Example of a electric motors include 12 v high speed electric motor, DC series wound electric motor, permanent magnet DC electric motor, phase AC induction motor, or the like. The first and second transmissions 18a, 18b can be one of a single-speed transmission, a two-speed transmission, a multispeed transmission, a single-speed transmission using a planetary gear reduction, or the like. The motor drive system 12 of the present disclosure uses modifications to current standard parts to minimize design requirements and/or use unique arrangements with configurations that minimize the packaging volume. The greater freedom to select motors independent of motor speed allows for a better motor match for a given type of vehicle which improves vehicle efficiency.

The motor drive system 12 is configured in a lateral arrangement relatively to the width of the vehicle 10. The motor 16 is connected to the engine 14 via a motor shaft that extends through the first transmission 18 and into the engine 14. The engine 14 is connected to the first transmission 18a and is coupled and decoupled from the first transmission 18a via the first clutch 24a. It should be noted that the first clutch 24a can be positioned in alternative manners, such as, on either side of the first transmission 18a, internal or within the first transmission 18a, or the like.

The motor 16 is operatively connected to the first transmission 18a and to the second transmission 18b. The second transmission 18b is operatively connected to the differential 22 such as, by a second clutch 24b. The differential 22 is operatively connected to a first wheel 26 and a second wheel 28 by a shaft, or the like. It should be noted that the second clutch 24b can also be positioned in alternative manners, such as, on either side of the second transmission 18b, internal or within the second transmission 18b, or the like.

The transmissions 18a, 18b can be de-coupled from the engine, motor, differential, or the like, by opening or closing the clutches 24a, 24b or by shifting the vehicle 10 into neutral. The first and second transmission 18a, 18b are positioned between the engine 14 and the motor 16 and enables the motor 16 to spin at any speed in relation to the speed of the engine 14 and thereby increases the efficiency and performance of the vehicle 10. Moreover, positioning the transmissions 18a, 18b between the engine 14 and the motor 16 enables the motor 16 to be operated at a speed range unhindered by engine speed limitations, thereby allowing for a lower cost motor 16. The motor 16 (via the motor shaft) is operatively connected to the differential 22 by shafts and gears. The differential 22 is coupled to front wheels 26, 28 via output shafts. This allows for various vehicle operating modes if the drive is coupled with another motor on the rear axle. If a separate drive motor is added to the wheels, the vehicle operating modes include an EV 4WD mode, a HEV 4WD mode, and a Series 2WD mode.

The motor drive system configuration 12 of the present disclosure includes a mechanical link between the engine 14 and the wheels 26, 28 to thereby minimize or eliminate efficiency losses in the generator and/or motor 16. Furthermore, one electric machine is used as a generator and is mounted on the engine 14. This enables the reduction of the number of electric machines needed or used and enables the electric machines to operate at speeds that allow for minimal costs. For example, large, slow motors need larger generators (that require more magnetic material) for a given amount of power as compared to a higher speed motor. The motor drive system configuration 12 of the present disclosure also enables the use of high speed motors and thereby reduces driveline costs.

In the EV 4WD mode, the clutch 24a between the engine 14 and the motor 16 is open. The motor 16 drives the front wheels 26, 28 using battery power and the rear wheels are driven by another motor.

In the HEV 4WD mode, the motor 16 provides power at launch and low speeds. At higher speeds, the engine 14 also provides power. At cruising speed, the engine 14 will provide most or all of the power directly to the front wheels 26, 28, avoiding losses through the two electric machines. If the front wheels 26, 28 start to slip or if power needs to be provided to all wheels, the rear motor will power the rear wheels.

In the Series 2WD mode, the clutch 24a between the motor 16 and the engine 14 is closed. The clutch 24b between the motor 16 and wheels 26, 28 is open. The engine 14 provides power to the motor 16. The motor 16 (powered by the engine) provides the electrical power to the rear drive.

Referring now to FIG. 3, a schematic of an alternate motor drive system configuration 212 is shown. In this embodiment, the motor drive system 212 is configured in a longitudinal arrangement relatively to the length of the vehicle 10. The engine 214 is connected to a first wheel 226 by a differential 222 and to a second wheel 228. The engine 214 is also connected to a first transmission 218a (alternatively, the first transmission 218a can be a single-speed planetary gear reduction, or the like) via a first clutch 224a. It should be noted that the first clutch 224a can be positioned in alternative manners, such as, on either side of the first transmission 218a, internal or within the first transmission 218a, or the like. The first transmission 218a is operatively connected to a motor 216. The motor 216 is operatively connected to a second transmission 218b via a second clutch 224b. The second transmission 218b is operatively connected to the differential 222 via a gear 230 (such as, a pinion gear, planetary gear set, or the like). It should be noted that the second clutch 224b can be positioned in alternative manners, such as, on either side of the second transmission 218b, internal or within the second transmission 218b, or the like.

Referring now to FIG. 4, a chart detailing various examples of operating modes of the motor drive systems of FIGS. 2 and 3 is shown, although others are contemplated. While the vehicle is operating in a particular mode, components of the drive system, such as, the engine, the first clutch, the first transmission or gearbox, the motor, the second transmission or gearbox, and the second clutch perform a function.

In operating mode one shown at 250, the motor is starting the engine. In this mode, the engine is cranking, the first clutch is closed, the first transmission is in gear, the motor provides power, the second transmission is not in use, and the second clutch is open.

In operating mode two shown at 255, the engine and/or the motor are driving the wheels of the vehicle. In this mode, the engine is powering, the first clutch is closed, the first transmission is in gear, the motor provides power, the second transmission is in gear, and the second clutch is closed.

In operating mode three shown at 260, the engine is driving the motor (acting as a generator) and the vehicle wheels are decoupled. In this mode, the engine is powering the vehicle, the first clutch is closed, the first transmission is in gear, the motor is generating electricity, the second transmission is not in use, and the second clutch is open. In order to drive the vehicle 10, a second motor must exist, such as, at the rear of the vehicle 10, or the like.

In operating mode four shown at 265, the motor is driving the vehicle wheels (EV operation). In this mode, the engine is not in use, the first clutch is open, the first transmission is not in use, the motor provides power, the second transmission is in gear, and the second clutch is closed.

In operating mode five shown at 270, the motor is taking power from the vehicle wheels and the vehicle is undergoing regenerative braking. In this mode, the engine is not in use (but maybe at idle or off), the first clutch is open, the first transmission is not in use, the motor is generating, the second transmission is in gear, and the second clutch is closed.

Figure 5:
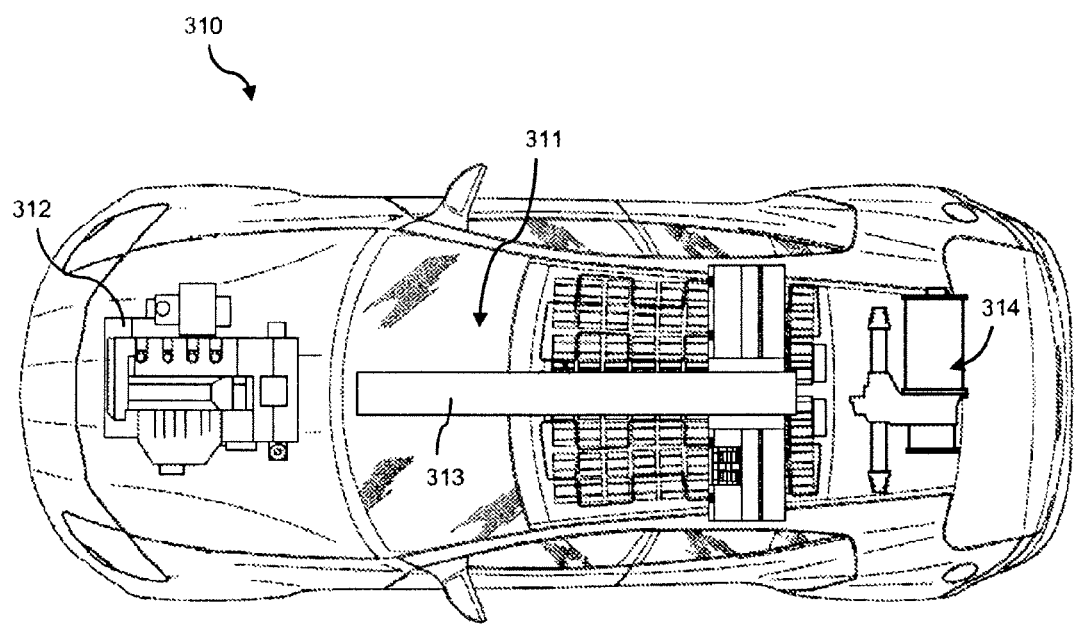
FIG. 5 is a top view of a vehicle and powertrain architecture having a motor drive system, according to an exemplary embodiment.

Referring now to FIG. 5, a vehicle 310 with a powertrain architecture 311 having a motor drive system 12 is shown. The vehicle 310 includes a powertrain 311 that controls the operation of the vehicle 310. The powertrain 311 can include various components, such as, engines, transmissions or gear boxes, drive shafts, differentials, electric motors, wheels, or the like, as previously described. The vehicle 310 may also include a gasoline powered engine that supplements one or more electric motors when required under certain operating conditions. The electrical energy is stored in an energy storage device, such as the battery 313. The battery 313 may be a single unit, or a plurality of modules arranged in a predetermined manner, such as in series. Various types of batteries may be used, such as lead acid, or lithium-ion or the like. The battery is contained within a battery case and coupled to the vehicle's frame. The vehicle 310 also includes a motor drive system 312.

The motor drive system 312 is located at the front of the vehicle and can have various configurations, such as, the motor drive system configurations of FIGS. 2-3. The powertrain 311 can also includes a motor drive system 314 at the rear of the vehicle 310. In this embodiment, the vehicle 310 includes a series hybrid high speed motor drive system 312 configuration, as shown in FIG. 2. The motor drive system 312 includes a motor driven generator. The motor drives the rear vehicle wheels through a single or multispeed transmission. The rear wheels can be or have motors with or without a reduction. Any one or combination of the motor drive system configurations of the present disclosure may be used in any type of vehicle, such as, an HEV, or the like, and with any type of powertrain architecture, such as, a series rear wheel drive (Series RWD), a series all wheel drive (Series AWD), an all wheel drive parallel (AWD Parallel), or the like.

The foregoing designs shown and discussed may be modified with additional gears, ratios, speeds and/or incorporated with other solutions, components, or the like. They may also be mounted in any configuration and coupled together using any known techniques.

Many modifications and variations of the present disclosure are possible in light of the above teachings. Therefore, within the scope of the appended claim, the present disclosure may be practiced other than as specifically described.

What is claimed is:

1. A motor drive system configuration for a hybrid vehicle, the motor drive system comprising:
   an engine operable for providing power to the vehicle;
   a first motor operable for providing power to a first wheel and a second wheel of the vehicle;
   a second motor operable for providing power to a third wheel and a fourth wheel;
   a first transmission mounted between the engine and the first motor and in operative engagement with the first motor and the engine;
   a first clutch for coupling and decoupling the first motor with the engine;
   a differential in operative engagement with the first transmission and coupled to the first wheel and the second wheel;
   a second transmission in operative engagement with the first motor and the differential; and
   a second clutch for coupling and decoupling the first motor with the differential;
   wherein the drive system is configured to operate in an operating mode wherein the first clutch is closed so that the engine can provide power to the first motor and the second clutch is open so that the first motor is decoupled with the differential and the first motor cannot provide power to the first wheel and the second wheel; and wherein in the operating mode power is provided to drive the vehicle by the second motor.

2. The motor drive system configuration of claim 1, wherein the first motor is a high speed electric motor.

3. The motor drive system configuration of claim 1, wherein the first transmission is a multi-speed transmission.

4. The motor drive system configuration of claim 1, wherein the motor drive system is configured in a transverse arrangement relative a length dimension of the vehicle.

5. The motor drive system configuration of claim 1, wherein the motor drive system is configured in a longitudinal arrangement relative a length dimension of the vehicle.

6. The motor drive system configuration of claim 1, further comprising a gear in operative engagement between the second transmission and the differential.

7. The motor drive system configuration of claim 6, wherein the gear is a pinion gear.

* * * * *